Jan. 10, 1939.  W. L. HANSEN ET AL  2,143,653
ROTOR
Filed May 22, 1936
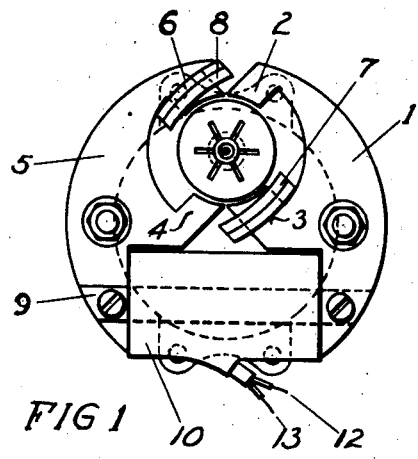
FIG 1
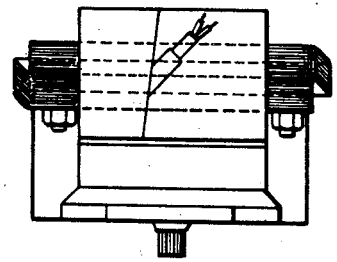
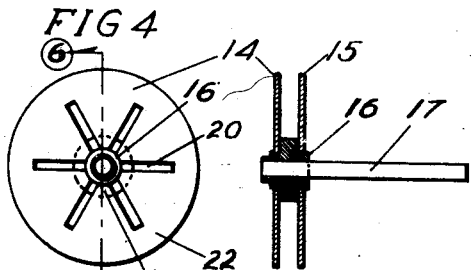
FIG 4  FIG 6
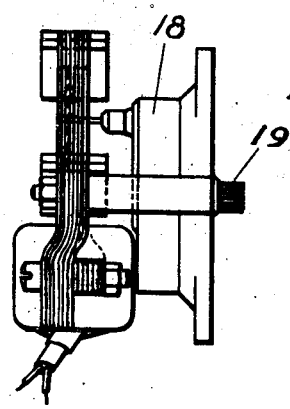
FIG 2
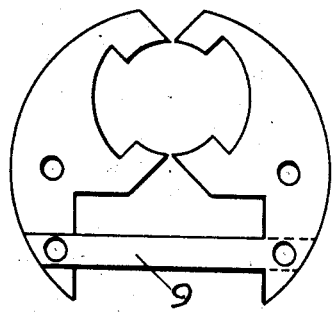
FIG 5
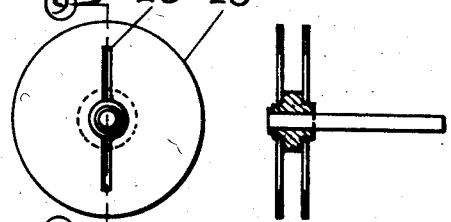
FIG 7  FIG 8  FIG 9
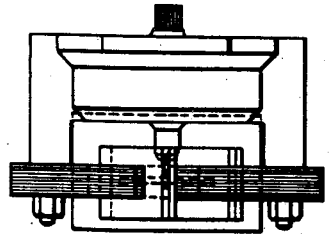
FIG 3
INVENTOR
WILLIAM L. HANSEN
IRA N. HURST
BY Toulmin & Toulmin
ATTORNEY Patented Jan. 10, 1939

2,143,653

UNITED STATES PATENT OFFICE 2,143,653

ROTOR

William L. Hansen and Ira N. Hurst, Princeton, Ind., assignors to Hansen Mfg. Company, Inc., Princeton, Ind., a corporation of Indiana Application May 22, 1936, Serial No. 81,158

2 Claims. (Cl. 172—278)

Our invention relates to synchronous motors and in particular to sub-synchronous motors.

It is an object of our invention to provide a sub-synchronous motor of bi-pole construction which operates at speeds depending upon the arrangement of the poles and the construction of the rotor.

It is our object to provide a balance of power with a shaded pole construction as compared to that of an unshaded pole.

It is a further object to secure the result desired by increasing the size of the shaded pole until the shaded pole balances with the unshaded pole.

In particular it is an object of this invention to provide a rotor disk or disks having a plurality of slots, the number of slots and the arrangement of the slots being used to determine the speed of the rotor.

The special object of this invention is to provide a rotor comprising a pair of parallel disks mounted on a common shaft and a common hub, with oppositely disposed slots radially arranged in the rotor disks.

It is our object to provide a self-starting motor for sub-synchronous speeds for use in a bi-pole motor.

Referring to the drawing:

Figure 1 is a front elevation of the motor.
Figure 2 is a side elevation.
Figure 3 is a top plan view.
Figure 4 is a bottom plan view.
Figure 5 is a detailed front elevation of the rotor.
Figure 6 is a section on the line 6—6 of Figure 5 looking in the direction of the arrows.
Figures 7 is a front elevation of a pair of the stampings comprising the magnet field of the motor.
Figure 8 is a front elevation of a modified form of rotor.
Figure 9 is a section on the line 9—9 of Figure 8 looking in the direction of the arrows.

In a motor having a bi-pole field, we have found that a flat, hardened steel disk with a plurality of slots across the center will synchronize by reason of the slots. The continuous unbroken rim and the hard qualities of the steel insure self-starting.

Our particular contribution is synchronization by the use of slots on the inner portion of the rotor. These slots serve to break up definitely the rotor into established magnetic poles. For instance, we secure synchronization at a sub-synchronous speed of 1200 R. P. M. By this means only the points of the star remain, that is, the points on the inner portion of the disk. These points are used to mount the disk or disks on a hub of non-magnetic material such as brass. This improves the rotor and lowers manufacturing costs so that a small, self-starting motor can be produced at low cost to run at sub-synchronous speeds.

By sub-synchronous speeds we mean that a synchronous motor with a bi-pole field which has a natural tendency to run at 3600 R. P. M. can be made to run by our invention at a speed of 1200 R. P. M.

Referring to the drawing in detail, 1 designates magnet field plates having a small pole 2 and a relatively large pole 3, the latter being arranged opposite to a small pole 4 of the adjacent plate 5 which in turn has a large pole 6 opposite the small pole 2 of the first mentioned plate. The large poles are provided with shading coils 7 and 8 respectively. Extensions 9 which overlap on the adjacent plates support a field coil 10, which is supplied with current from the leads 12 and 13.

Within the spaced poles, there is mounted the rotor disks 14 and 15 which are of hardened steel. These disks are mounted upon a non-magnetic hub 16 made of such materials as brass. The rotor shaft 17 enters the gear box 18 and through a usual train of gears drives the pinion 19.

The advantages of this invention center around the selection, design and construction of the rotor. It will be noted that the rotor has a plurality of radial slots 20 which in any one disk are symmetrically disposed, preferably opposite one another, so that the star points 21 are the points of contact and support on the hub 16. This leaves a continuous, outer rim 22 in the hardened steel disks. The slots 20 in the respective disks 14 and 15 are arranged in alignment with and opposite to one another.

As a consequence, we have found that the motor which would ordinarily run at 3600 R. P. M. will run at the sub-synchronous speed of 1200 R. P. M., as the slots 20 serve to break up the rotor into established magnetic poles which secure synchronization at this sub-synchronous speed.

The unbroken rim 22 with the hard qualities of the steel insures a self-starting motor.

Referring to the form of rotor shown in Figures 8 and 9, this rotor consists of a flat hardened carbon steel disk or disks 23 with slots 20 oppositely disposed to one another. This construction gives the greatest starting power due to the large area of the unbroken rim, which allows the shifting of the magnetic poles around the edge. It is synchronized by the establishment of definite magnetic poles on each end of the slot 20.

These magnetic poles shift somewhat in starting but are almost instantaneously synchronized after starting due to the wide sections cross-wise to the synchronizing slot. The slot 20 is the means of synchronizing because the poles are diametrically established with respect to the slot.

It will be understood that we desire to comprehend within our invention such modifications as may be necessary to adapt it to varying conditions and uses.

Having thus fully described our invention, what we claim as new and desire to secure by Letters Patent, is:

1. A rotor for electrical synchronous motors comprising a flat hardened steel disc with a central aperture and a continuous rim portion integral therewith, said disc having a plurality of oppositely directed slots extending outwardly from said central aperture with their outer ends spaced inwardly from the periphery of said integral rim portion and the inner ends extending into said central aperture, said slots dividing said rotor into a plurality of sector-shaped pole portions, the circumferential widths of said slots being relatively small in proportion to the circumferential widths of said sector-shaped pole portions.

2. A rotor for electrical synchronous motors comprising a flat hardened steel disc with a central aperture and a continuous rim portion integral therewith, said disc having a plurality of oppositely directed slots extending outwardly from said central aperture with their outer ends spaced inwardly from the periphery of said integral rim portion and the inner ends extending into said central aperture, said slots dividing said rotor into a plurality of sector-shaped pole portions, the circumferential widths of said slots being relatively small in proportion to the circumferential widths of said sector-shaped pole portions, and non-magnetic means mounted in said central aperture for rotatably supporting said disc, whereby to mechanically interconnect the spaced inner ends of said sector-shaped pole portions while maintaining the magnetic separation thereof.

WILLIAM L. HANSEN.
IRA N. HURST.